United States Patent Office 3,457,650
Patented July 29, 1969

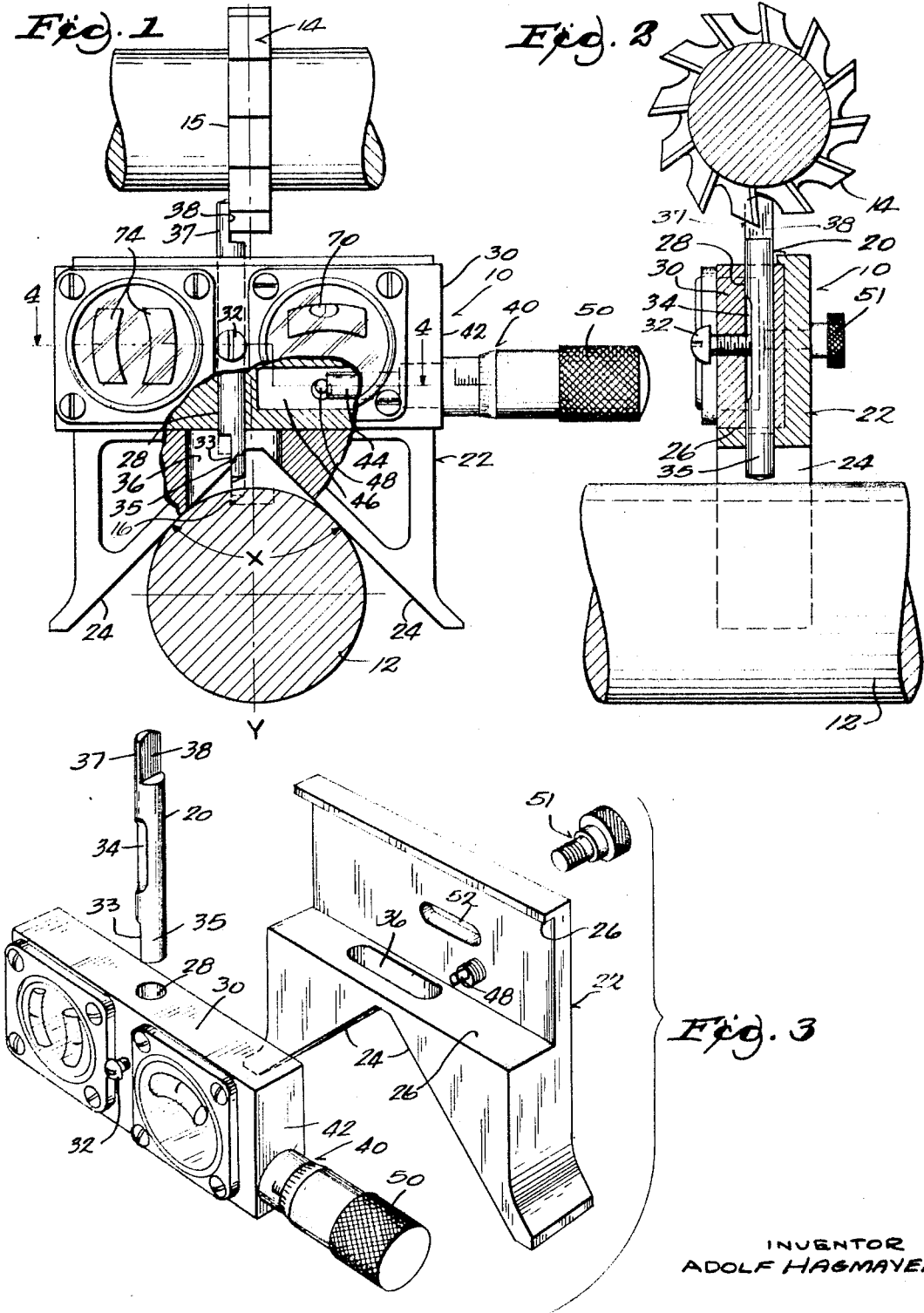

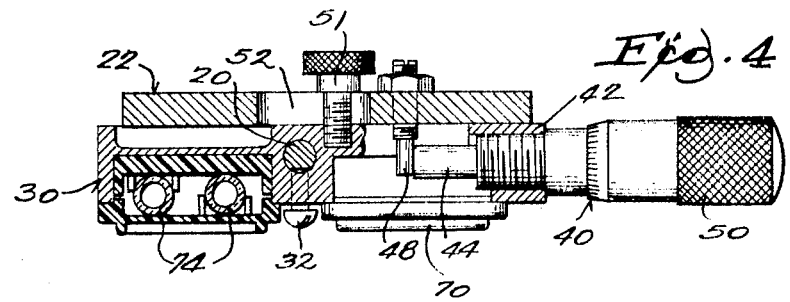
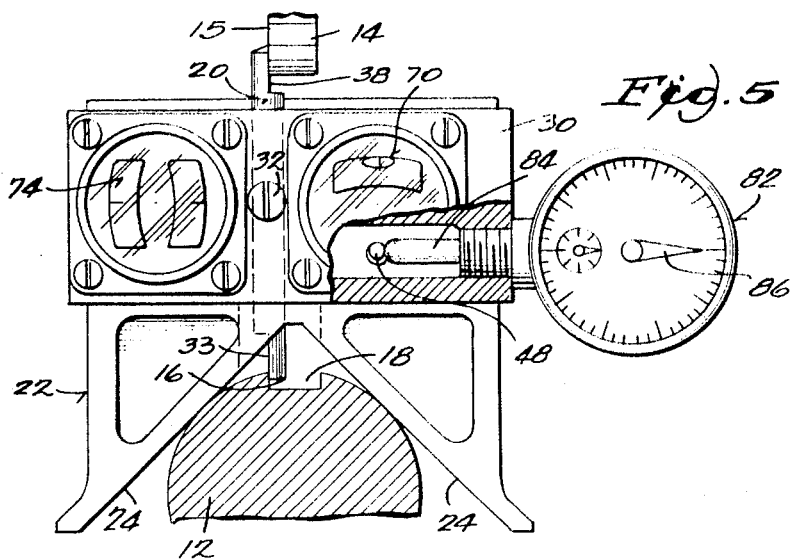
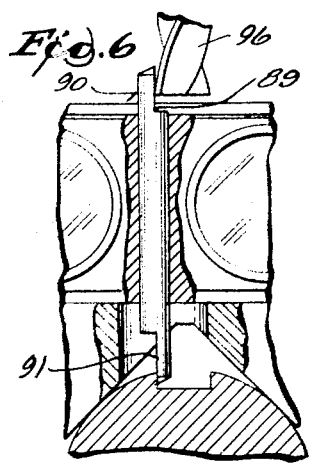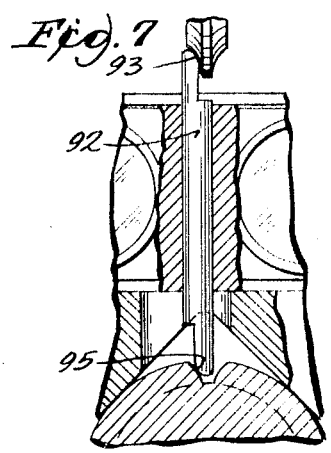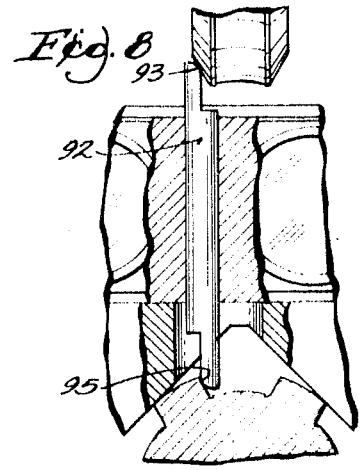

3,457,650
PRECISION KEYWAY GAUGE
Adolf Hagmayer, 301 Brookdale Drive,
South Milwaukee, Wis. 53172
Filed Oct. 6, 1967, Ser. No. 673,385
Int. Cl. B27g 23/00
U.S. Cl. 33—185          6 Claims

ABSTRACT OF THE DISCLOSURE

Disclosed herein is a keyway gauge having a pair of aligning surfaces that intersect at an angle, with a slide block mounted in the housing for movement transversely to a plane that bisects the angle. A gauge pin is mounted in the slide block with its axis parallel to said plane and a distance indicator mounted on the slide block indicates the distance of the axis of said gauge pin from said plane. Levels are mounted on the slide block to level the gauge according to the position of the workpiece. The gauge pin is axially moveable in said slide block so that it can be used either to align a cutting tool with the workpiece or to check the alignment of the cut being made in the workpiece.

Background of the invention

Cutting keyways in shafts, and similar work, have in the past required a very accurate setting of the cutting tool to assure that the keyway is cut in a line parallel to the axis of the shaft and periodic checks should be made during the cutting of the keyway to determine if any skewing has occurred. This requires not only an accurate setting of the cutting tool preparatory to cutting the keyway but also an accurate gauge for measuring the keyway as it is cut. There are a number of gauges available that can be used to perform one or the other of these requirements, however, none of these gauges are capable of providing both an accurate gauge for locating the cutting tool with respect to shaft and checking of the keyway as it is cut.

Summary of the invention

This invention relates to a keyway gauge which can be used to positively align a cutting tool with a workpiece such as a shaft and to determine whether the tool is accurately cutting the workpiece. The gauge includes a housing or block having two aligning surfaces that meet at an angle and a guide track transverse to a plane that bisects the angle. An adjustable slide block is mounted in the track and an adjusting or measuring device is used to move the slide block in the track. A gauge pin having flat surfaces at each end, which lie in a common plane, is mounted in the slide block with the plane of the flat surfaces parallel to the plane that bisects the angle of the aligning surfaces. The adjusting or measuring device is used to determine or predetermine the distance of the plane of the flat surfaces from the plane that bisects the angle of the aligning surface. If this distance is known, one of the flat surfaces can be used as a guide to align the cutting tool with the workpiece while the other flat surface indicates the line on the workpiece where the wall of the cut is being made.

The gauge is placed on a shaft which has been oriented with respect to a cutting tool, with the aligning surfaces resting on the surface of the shaft. A horizontal or vertical level provided in the face of the slide block is used to orient the gauge with the shaft and cutting tool. The plane that bisects the angle of intersection of the aligning surfaces will then pass through the axis of the shaft, regardless of its diameter. The slide block is then moved a predetermined distance as indicated by the measuring device to align one of the flat surfaces on the gauge pin with the inner wall of the keyway to be cut. A keyway cutting tool is aligned with the other flat surface on the gauge pin. The cutting tool can then be operated to cut a keyway in the shaft, and as the work proceeds the gauge can be used to check the accuracy of the keyway.

Other objects and advantages will become apparent from the following description when read in connection with the accompanying drawings in which:

FIG. 1 is a front view of the keyway gauge mounted on a shaft.

FIG. 2 is a side view in section of the gauge shown in FIG. 1.

FIG. 3 is an exploded view in perspective of the gauge.

FIG. 4 is a top view taken on line 4—4 of the gauge shown in FIG. 1.

FIG. 5 is a front view of a modified keyway gauge.

FIGS. 6, 7 and 8 are fragmentary end views of the gauge used with different cutting tools.

Description of the preferred embodiments

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

Referring to FIGS. 1 through 4 of the drawings, my keyway gauge 10 is shown positioned on a shaft 12 with a milling type cutting tool 14 located above the gauge. The keyway gauge includes a housing or block 22 having a pair of aligning surfaces 24 which intersect at an angle $x$. When the housing or block 22 is placed on a shaft as seen in FIG. 1, the plane $y$ which bisects the angle $x$ will pass through the axis of the shaft. Since this relationship is known, it is only necessary to orient the shaft, gauge and cutting tool in a common plane in order to make an accurate keyway.

A gauge pin 20 is positioned in an aperture 28 in a slide block 30 that is mounted in a track such as a guide groove 26 in the housing. The guide groove 26 is perpendicular to the plane $y$ so that the slide block will move only perpendicular to the plane $y$. The gauge pin 20 has its axis parallel to the plane $y$ and is retained in the aperture 28 by a set screw 32 that extends into a slot 34 in the gauge pin. The gauge pin can be moved axially in the aperture to the limits of slot 34 but is prevented from any rotary motion. One end 35 of the gauge pin projects through a slot 36 in the housing into the space between the aligning surfaces 24 and is provided with a flat surface 33 that is maintained by screw 32 parallel to the plane $y$ that bisects the angle $x$ between the aligning surfaces. The other end 37 of the gauge pin projects outward from the housing and has a flat surface 38 coplanar with flat surface 33, but facing in the opposite direction.

The position of the slide block 30 in the guide groove 26 is determined or measured by a means of a micrometer 40 secured to wall 42 of the slide block. The anvil 44 of the micrometer extends into a recess 46 in the slide block and is seated against pin 48 in the housing. To set the slide block in the housing, the head 50 of the micrometer is turned to the required setting. The slide block is moved to the left in FIG. 1 until the anvil 44 comes into contact with pin 48. The flat surfaces 33 and 38 are initially coplanar with plane $y$ when the micrometer is at zero. The distance the slide block is moved will be the distance between the plane of the flat surfaces 33 and 38 and the plane $y$. This distance will be equal to one half the width of the keyway to be cut in the shaft since plane $y$ passes through the center of the keyway.

After the slide block has been moved the prescribed distance, set screw 51 which extends through slot 52 in the housing is tightened to lock the slide block in position.

The keyway gauge is used to align the outer surface 15 of the cutting tool 14 with the contemplated inner wall 16 of the keyway 18 that is to be cut in the shaft. This is accomplished by aligning the keyway gauge 10 with the axis of the shaft 12, moving gauge pin 20 to a position corresponding to the inner wall of the keyway to be cut and then aligning the cutting tool with the gauge pin. The cutting tool can then be moved within its plane of rotation to cut the keyway.

As previously indicated, the key gauge 10 will only work if a common reference plane is used for the shaft 12 and cutting tool 14. This plane may preferably be either horizontal or vertical. Horizontal levels 70 and vertical levels 74 are provided on the slide block 30 so that the keyway gauge can be used either side up for either a horizontally or a vertically leveled shaft. When the keyway gauge is placed on a shaft after setting the proper width distance on the micrometer and locking the slide block to the housing, the appropriate level is centered, which automatically aligns the plane $y$ with the axis of the shaft. The side 15 of the cutting tool 14 is then aligned with the flat surface 38 on the gauge pin. The cutting tool is thus correctly aligned with the inner wall of the keyway to be cut. The keyway can be measured at any time to be sure that it is being cut accurately by merely placing my gauge on the shaft and aligning flat surface 33 with the inner wall of the cut with the slide block level. If the keyway is straight, surface 33 will just touch its side. To the extent that the cut is off, it will be impossible to level my gauge with surface 33 just touching the side of the cut.

In FIG. 5 a modified keyway gauge is shown in which a dial indicator 82 is used in place of a micrometer. The slide block 30 is moved manually with the anvil 84 abutting pin 48. The needle 86 will rotate indicating the amount of movement of the slide block and on reaching the required measurements the slide block is locked in position by set screw 51.

In FIGS. 6, 7 and 8 various types of alternate modified gauge pins are shown which can be used with this gauge depending on the type of cutting tool that is to be used to cut the workpiece.

In FIG. 6 the gauge pin 90 has flat surfaces 89 and 91 similar to the gauge pin in FIG. 1 for aligning a rotary cutting tool 96. When cutting gear teeth (FIG. 7) or splines (FIG. 8), the gauge pin 92 may have arcuate ends 93 and 95 facing the opposite directions.

What is claimed is:

1. A keyway gauge for aligning a cutting tool with a shaft, said gauge comprising a body having a pair of aligning surfaces intersecting at an angle,
    a slide mounted in said body,
    a gauge pin mounted for axial movement in said slide,
    said pin being axially aligned parallel with a plane that bisects the angle of intersection of said aligning surfaces,
    and adjustment means adapted to measure the distance between the plane that bisects the angle of intersection of said aligning surfaces and a surface of said pin, said slide being adapted to move laterally respecting said plane, said gauge pin having flat surfaces at each end lying in a common plane parallel to the plane that bisects the angle of intersection of said aligning surfaces, said surfaces being measured by said adjustment means, said adjustment means comprising a micrometer mounted on said slide, said housing including a reference pin, the anvil of the micrometer being adapted to rest on said reference pin when said slide is moved to measuring position.

2. A keyway gauge according to claim 1 wherein said flat surfaces face in opposite directions.

3. A keyway gauge according to claim 1 including a set screw to lock the slide to the housing.

4. A keyway gauge according to claim 1 wherein said cutting tool and said shaft are aligned with their respective axes in predetermined planes, said body further comprising at least one leveling device mounted and adapted to indicate whether said gauge pin is so related to said predetermined planes that a cut made with said cutting tool after aligning a margin of the tool with a surface of said gauge pin will be accurate.

5. A keyway gauge according to claim 4 including horizontal and vertical leveling devices.

6. A keyway gauge according to claim 5 wherein said gauge pin has a flat surface at each end lying in a common plane which is parallel to the plane that bisects the angle of intersection of said aligning surfaces.

References Cited

UNITED STATES PATENTS

| | | | |
|---|---|---|---|
| 1,486,667 | 3/1924 | Jerman | 33—185 |
| 1,749,980 | 3/1930 | Loeser | 33—185 X |
| 2,547,683 | 4/1951 | Blesi | 33—185 |

FOREIGN PATENTS

| | | |
|---|---|---|
| 138,788 | 9/1950 | Australia. |
| 112,300 | 10/1964 | Czechoslavakia. |
| 298,172 | 7/1954 | Switzerland. |

SAMUEL S. MATTHEWS, Primary Examiner